2

3,686,174
CERTAIN DIGLYCIDYL ESTERS OF
N-HETEROCYCLIC COMPOUNDS
Juergen Habermeir Allschwil, Hans Batzer, Arlesheim, and Daniel Porret, Binningen, Switzerland, assignors to Ciba-Geigy AG, Basel, Switzerland
No Drawing. Filed Oct. 19, 1970, Ser. No. 82,071
Claims priority, application Switzerland, Nov. 27, 1969, 17,672/69
Int. Cl. C07d 49/32, 51/20, 51/30
U.S. Cl. 260—257          8 Claims

ABSTRACT OF THE DISCLOSURE

New diglycidyl ethers of mononuclear five-membered or six-membered, unsubstituted or substituted, N-heterocyclic compounds, containing two NH groups in the molecule, which contain styrene oxide in the form of an adduct, obtained by a reaction of mononuclear, five-membered or six-membered, unsubstituted or substituted N-heterocyclic compounds, for example hydantoin, barbituric acid, uracil, dihydrouracil, parabanic acid and the appropriate derivatives, with styrene oxide to give monoalcohols or dialcohols, and subsequent glycidylation of the OH groups and NH groups to give the corresponding glycidyl ethers. The diglycidyl ethers may be used with common curing agents and are therefore suitable for the manufacture of mouldings, including sheet-like materials.

The subject of the present invention are new diglycidyl ethers of general formula

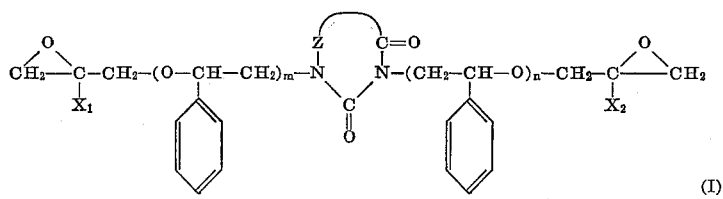

(I)

wherein $X_1$ and $X_2$ each denote a hydrogen atom or a methyl group and Z denotes a nitrogen-free, divalent radical which is necessary for completing a five-membered or six-membered, unsubstituted or substituted, heterocyclic ring, and $m$ and $n$ each represent an integer having a value of 0 to 30, preferably of 0 to 4, with the sum of $m$ and $n$ having to be at least 1.

The radical Z in the Formula I preferably consists only of carbon and hydrogen or of carbon, hydrogen and oxygen. It can for example be a radical of formula:

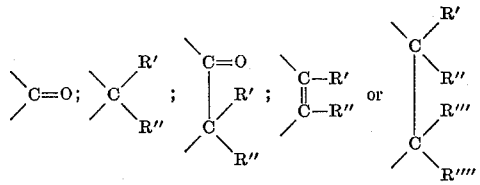

wherein R', R", R'" and R"" independently of one another can each denote a hydrogen atom or, for example, an alkyl radical, an alkenyl radical, a cycloalkyl radical or an optionally substituted phenyl radical.

The next diglycidyl ethers of Formula I can be manufactured if compounds of general formula

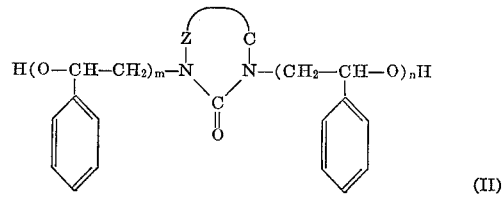

(II)

wherein Z, $m$ and $n$ have the same meaning as in Formula I are reacted in a single stage or several stages with an epihalogenohydrin or β-methylepihalogenohydrin, such as for example epichlorohydrin, β-methylepichlorohydrin or epibromhydrin, in a manner which is in itself known.

In the single-stage process, the reaction of epihalogenohydrin with a compound of Formula II takes place in the presence of alkali, with sodium hydroxide or potassium hydroxide preferably being used. In this single-stage process, the epichlorohydrin which is used for the reaction in accordance with the process can be replaced wholly or partly by dichlorohydrin, which under the process conditions and on appropriate addition of alkali is transiently converted to epichlorohydrin and then reacts as such with the monoalcohol or dialocohol of Formula II. In the two-stage process which is preferably used, the compound of Formula II and an epihalogenohydrin undergo an addition reaction, in a first stage, in the presence of acid or basic catalysts, to give the halogenohydrin ether, and thereafter the latter is dehydrohalogenated in a second stage by means of alkalis, such as potassium hydroxide or sodium hydroxide, to give the glycidyl ether.

Suitable acid catalysts for the two-stage process are especially Lewis acids, such as for example, $AlCl_3$, $SbCl_5$, $SnCl_4$, $FeCl_3$, $ZnCl_2$, $BF_3$ and their complexes with organic compounds.

The reaction can also be accelerated by adding other suitable catalysts, such as for example alkali hydroxides, such as sodium hydroxide, and alkali halides, such as lithium chloride, potassium chloride, or sodium chloride, bromide and fluoride.

Preferably, the new glycidyl ethers according to the invention, of Formula I, are manufactured by reacting an epihalogenohydrin, preferably epichlorohydrin, in the presence of a basic catalyst, such as preferably a tertiary amine or a quaternary ammonium base or a quaternary ammonium salt, with a compound of Formula II and treating the resulting product, containing halogenohydrin groups, with agents which split off hydrogen halide.

Suitable catalysts for the addition of epichlorohydrin are above all tertiary amines, such as triethylamine, tri-n-propylamine, benzyldimethylamine, N,N'-dimethylaniline and triethanolamine; quaternary ammonium bases, such as benzyltrimethylammonium hydroxide, quaternary ammonium salts, such as tetramethylammonium chloride, tetraethylammonium chloride, benzyltrimethylammonium chloride, benzyltrimethylammonium acetate and methyltriethylammonium chloride, also ion exchange resins having tertiary or quaternary amino groups, and also trialkylhydrazonium salts, such as trimethylhydrazonium iodide.

Suitable catalysts are furthermore also low molecular thioethers and sulphonium salts, or compounds which can be converted into thioethers or sulphonium compounds by means of the epihalogenohydrins, such as hydrogen sulphide, sodium sulphide or mercaptans.

As such thioethers or sulphonium salts there may be mentioned: diethyl - sulphide, β-hydroxyethyl - ethylsulphide, β-hydroxypropyl-ethyl-sulphide, ω-hydroxy-tetramethylene - ethyl - sulphide, thiodiglycol, mono-β-cyanoethylthioglycol-ether, dibenzyl-sulphide, benzyl-ethyl-sulphide, benzyl-butyl-sulphide, trimethylsulphonium iodide, tris(β-hydroxyethyl)sulphonium chloride, dibenzylmethylsulphonium bromide, 2,3 - epoxypropylmethylethylsulphonium iodide, dodecyl-methyl-sulphide and dithiane.

Strong alkalis, such as anhydrous sodium hydroxide or aqueous sodium hydroxide solution are as a rule used for the dehydrohalogenation, but other alkaline reagents, such as potassium hydroxide, barium hydroxide, calcium hydroxide, sodium carbonate or potassium carbonate can however also be used.

The dehydrohalogenation can in turn be carried out in several stages. Thus it is possible first to carry out a treatment with solid sodium hydroxide or potassium hydroxide at elevated temperature, and after distilling off the excess epihalogenohydrin to heat the residue in an inert solvent with a less than equivalent amount of concentrated alkali hydroxide solution, for example 50% strength sodium hydroxide solution.

Possible epihalogenohydrins are epibromohydrin, β-methylepichlorohydrin and above all epichlorohydrin. Good yields are obtained if an excess of epichlorohydrin, and in particular preferably 4 to 40 mols of epichlorohydrin, are used per hydroxyl group or NH group. During the first reaction, before the addition of alkali, a partial epoxidation of the bis-chlorohydrin ether of a compound of Formula II already takes place. The epichlorohydrin, which acts as a hydrogen chloride acceptor, is thereby partially converted into glycerine-dichlorohydrin. On treatment with alkali, this is again regenerated to epichlorohydrin.

The monoalcohols or dialcohols of general Formula II have hitherto not yet been described in the literature and are obtained in a known manner by reacting mononuclear N-heterocyclic compounds of general formula

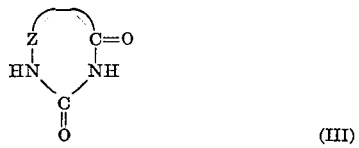

(III)

wherein Z has the same meaning as in Formula I, with styrene oxide in the presence of a suitable catalyst.

The addition of styrene oxide to one or both NH groups of the N-heterocyclic compounds of Formula III can be carried out both in the presence of acid catalysts and of alkaline catalysts, with a slight excess of equivalents of epoxide groups of the alkene oxide being employed per equivalents of NH group of the N-heterocyclic compound of Formula III.

Preferably, however, alkaline catalysts, such as tetraethylammonium chloride or tertiary amines, are used in the manufacture of monoalcohols and dialcohols of Formula II in which the sum of m and n is 1 or 2. However, alkali halides, such as lithium chloride or sodium chloride, can also be used successfully for this addition reaction; it also takes place without catalysts.

In the manufacture of dialcohols of Formula II in which the sum of m and n is greater than 2, it is preferable to start from the simple dialcohols of Formula II in which m and n are each 1, and to add further styrene oxide to both OH groups of this compound in the presence of acid catalysts.

The mononuclear N-heterocyclic compounds of Formula II used for the manufacture of the new styrene oxide addition products of Formula II are above all hydantoin, hydantoin derivatives, barbituric acid, barbituric acid derivatives, uracil, uracil derivatives, dihydrouracil and dihydrouracil derivatives, and also parabanic acid.

Hydantoin and its preferred derivatives correspond to the general formula

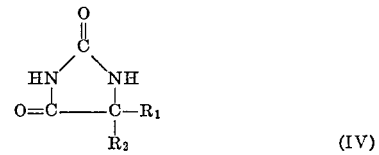

(IV)

wherein $R_1$ and $R_2$ each denote a hydrogen atom or a lower alkyl radical with 1 to 4 carbon atoms, or wherein $R_1$ and $R_2$ together form a tetramethylene or pentamethylene radical. Hydantoin, 5-methyl-hydantoin, 5-methyl-5 - ethyldydantoin, 5-n-propylhydantoin, 5-isopropyl-hydantoin, 1,3-diaza-spiro(4.5)-decane-2,4-dione, 1,3-diaza-spiro(4.4)-nonane-2,4-dione and preferably 5,5-dimethylhydantoin may be mentioned.

Barbituric acid and its preferred derivatives correspond to the general formula

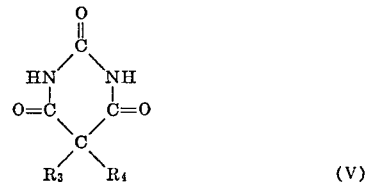

(V)

wherein $R_3$ and $R_4$ independently of one another each denote a hydrogen atom, an alkyl radical, an alkenyl radical, a cycloalkyl radical or cycloalkenyl radical, or a substituted or unsubstituted phenyl ralical.

The following may be mentioned:

barbituric acid,
5-ethylbarbituric acid,
5,5-diethylbarbituric acid,
5-ethyl-5-butylbarbituric acid,
5-ethyl-5-sec.-butylbarbituric acid,
5-ethyl-5-isopentylbarbituric acid,
5,5-diallylbarbituric acid,
5-allyl-5-isopropylbarbituric acid,
5-allyl-5-sec.-butylbarbituric acid,
5-ethyl-5(1'-methylbutyl)barbituric acid,
5-allyl-5(1'-methylbutyl)barbituric acid,
5-ethyl-5-phenylbarbituric acid and
5-ethyl-5(1'-cyclohexen-1-yl)barbituric acid.

Uracil and its preferred derivatives correspond to the general formula

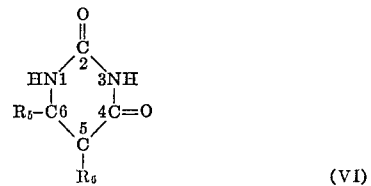

(VI)

wherein $R_5$ and $R_6$ both denote hydrogen atoms or one of the two radicals denotes a hydrogen atom and the other radical denotes a methyl group.

Uracils of Formula VI are uracil itself, and also 6-methyl-uracil and thymin (=5-methyl-uracil).

Dihydrouracil (=2,4-dioxo-hexahydropyrimidine) and its preferred derivatives correspond to the general formula:

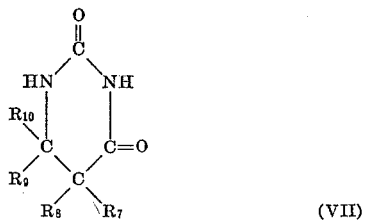

(VII)

wherein $R_7$ and $R_8$ both denote a hydrogen atom or identical or different alkyl radicals, preferably alkyl radicals with 1 to 4 carbon atoms, and $R_9$ and $R_{10}$ independently of one another each denote a hydrogen atom or an alkyl radical.

Preferably, in the above formula, both radicals $R_7$ and $R_8$ denote methyl groups, $R_9$ denotes a hydrogen atom or a lower alkyl radical with 1 to 4 carbon atoms and $R_{10}$ denotes a hydrogen atom. The following may be mentioned: 5,6-dihydrourcil, 5,5-dimethyl-5,6-dihydrouracil (2,4-dioxo-5,5-dimethylhexahydropyrimidine) and 5,5-dimethyl - 6 -isopropyl-5,6-dihydrouracil (2,4-dioxo-5,5-dimethyl-6-isopropylhexahydropyrimidine).

The new diglycidyl ethers according to the invention, of Formula I, react with the customary curing agents for polyepoxide compounds and can therefore be crosslinked or cured by addition of such curing agents, analogously to other polyfunctional epoxide compounds or epoxide resins. Possible curing agents of this nature are basic or acid compounds.

As suitable curing agents there may for example be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis(4-amino-3-methyl-cyclohexyl) methane, 3,5 - trimethyl - 3-(aminomethyl)cyclohexylamine ("isophoronediamine"), Mannich bases, such as 2,4,6-tris(dimethylaminomethyl)phenol; m-phenylenediamine, p-phenylenediamine, bis(4-aminophenyl)methane, bis(4-aminophenyl)sulphone, m-xylylenediamine; N-(2-aminoethyl)piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine, in excess, and polyepoxides, such as diomethane-polyglycidyl-ethers; ketimines, for example from acetone or methyl ethyl ketone and bis(p-aminophenyl) methane; adducts of monophenols or polyphenols and polyamines; polyamides, especially those from aliphatic polyamines, such as diethylenetriamine or triethylenetetramine and dimerised or trimerised unsaturated fatty acids, such as dimerised linseed oil fatty acid ("Versamid"); polymeric polysulphides ("Thiokol"); dicyandiamide, anilineformaldehyde resins; polyhydric phenols, for example resorcinol, 2,2-bis(4-hydroxyphenyl)propane or phenolformaldehyde resins; boron trifluoride and its complexes with organic compounds, such as $BF_3$-ether complexes and $BF_3$-amine complexes, for example $BF_2$-monoethylamine complex; acetoacetanilide-$BF_2$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (=methylnadicanhydride), 3,4,5, 6,7,7-hexachloro-3,6-endomethylene-$\Delta^4$ - tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

Curing accelerators can furthermore be employed during the curing reaction; when using polyamides, dicyandiamide, polymeric polysulphides or polycarboxylic anhydrides as curing agents, suitable accelerators are for example tertiary amines, their salts or quaternary ammonium compounds, for example 2,4,6-tris(dimethylainomethyl)phenol, benzyldimethylamine, 2-ethyl-4-methyl-imidazole, 4-amino-pyridine, triamylammonium phenolate and also alkali metal alcoholates, such as for example sodium hexanetriolate. In the amine curing reaction, monophenols or polyphenols, such as phenol or diomethane, salicylic acid or thiocyanates can for example be employed as accelerators.

The term "curing" as used here, denotes the conversion of the above diepoxides into insoluble and infusible, crosslinked products, and in particular, as a rule, with simultaneous shaping to give mouldings, such as castings, pressings or laminates and the like, or to give "Sheet-like or filen materials," such as coverings, coatings, lacquer films or adhesive bonds.

Depending on the choice of the curing agent, the curing can be carried out at room temperature (18–25° C.), or at elevated temperature (for example 50–180° C.).

If desired, the curing can also be carried out in two stages, by first prematurely stopping the curing reaction, or carrying out the first stage at only moderately elevated temperature, whereby a curable pre-adduct (so-called "B-stage") which is still fusible and soluble is obtained from the epoxide component and the curing agent component. Such a pre-adduct can for example serve for the manufacture of "prepregs," compression moulding compositions or sintering powders.

The new diglycidyl ethers represent viscous liquids; they can advantageously also be used as a mixture with other curable diepoxide or polyepoxide compounds. As such there may for example be mentioned: polyglycidyl ethers of polyhydric alcohols, such as polyethylene glycols, polypropylene glycols or 2,2-bis(4'-hydroxycyclohexyl)propane, 1,3-di-($\beta$-hydroxypropyl)-5,5-dimethylhydantoin, polyglycidyl ethers of polyhydric phenols, such as 2,2-bis(4'-hydroxyphenyl)propane (=diomethane), 2,2-bis(4'-hydroxy - 3',5 - dibromophenyl)propane, bis-(4-hydroxyphenyl)sulphone, 1,1,2,2-tetrakis(4 - hydroxyphenyl)-ethane or condensation products of formaldehyde with phenols manufactured in an acid medium, such as phenol novolaks or cresol novolaks; polyglycidyl esters of polycarboxylic acids, such as for example phthalic acid diglycidyl ester, isophthalic acid diglycidyl ester, tetrahydrophthalic acid diglycidyl ester or hexahydrophthalic acid diglycidyl ester; tri-glycidylisocyanurate, N,N'-diglycidyl-5,5-dimethylhydantoin, aminopolyepoxides, such as are obtained by dehydrohalogenation of the reaction products of epihalogenohydrin and primary or secondary amines, such as aniline or 4,4'-diaminodiphenylmethane; also, alicyclic compounds containing several epoxide groups, such as vinylcyclohexene-diepoxide,
dicyclopentadiene-diepoxide,
ethylene glycol-bis-(3,4-epoxytetrahydrodicyclopentadien-8-yl)-ether,
(3',4'-epoxycyclohexylmethyl)-3,4-epoxycyclohexanecarboxylate,
(3',4'-epoxy-6'-methylcyclohexylmethyl)-3,4-epoxy-6-methylcyclohexanecarboxylate,
bis(2,3-epoxycyclopentyl)ether or
3-(3',4'-epoxycyclohexyl)-2,4-dioxa-spiro-(5.5)-9,10-epoxy-undecane.

If desired, other known reactive diluents, such as for example styrene oxide, butyl-glycidyl-ether, isooctyl-glycidyl-ether, phenyl-glycidyl-ether, cresyl-glycidyl-ether and glycidyl esters of synthetic, highly branched, mainly tertiary aliphatic monocarboxylic acids ("Cardura E") can be conjointly used.

A further subject of the present invention are therefore curable mixtures which are suitable for the manufacture of mouldings, including sheet-like or filen materials, and which contain the diglycidyl ethers according to the invention, optionally together with other diepoxide or polyepoxide compounds and also curing agents for epoxide resins, such as polyamines or polycarboxylic acid anhydrides.

The diepoxides according to the invention, or their mixtures with other polyepoxide compounds and/or curing agents, can furthermore be mixed, in any stage before cure, with customary modifiers, such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention, there may for example be mentioned: coal tar, bitumen, natural or synthetic textile fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminum oxide trihydrate, chalk powders, gypsum, antimony trioxide bentones, silica aerogel ("Aerosil"), lithopone, barite, titanium dioxide, carbon black, graphite, oxide colours such as iron oxide, or metal powders, such as aluminum powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl phthalate, dioctyl phthalate and dinonyl phthalate, tricresyl phosphate, trixylenyl phosphate and also polypropylene glycols can for example be employed as placticisers for modifying the curable mixtures.

Silicones, cellulose acetobutyrate, polyvinyl butyral, waxes, stearates and the like (which are also in part used as mould release agents) can for example be added as flow control agents when employing the curable mixtures, especially in surface protection.

Especially for use in the lacquer field, the diepoxide compounds can furthermore be partially esterified in a known manner with carboxylic acids, such as especially higher unsaturated fatty acids. It is furthermore possible to add other curable synthetic resins, for example phenoplasts or aminoplasts, to such lacquer resin formulations.

The manufacture of the curable mixtures according to the invention can be effected in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be used in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow, unless otherwise states, parts denote parts by weight and percentages denote percentages by weight. The relationship of parts by volume to parts by weight is as of the millilitre to the gram.

In order to determine the mechanical and electrical properties of the curable mixtures described in the examples which follow, sheets of size 92 x 41 x 12 mm. were manufactured for determining the flexural strength, deflection, impact strength and water absorption. The test specimens (60 x 10 x 4 mm.) for the determination of the water absorption and for the flexural test and impact test (VSM 77103 and VSM 77105) were machined from the sheets.

Test specimens measuring 120 x 15 x 10 mm. were in each case cast for determining the heat distortion point according to Martens (DIN 53 458).

Sheets of dimensions 120 x 120 x 4 mm. were cast for testing the arcing resistance and the tracking resistance (VDE 0303).

MANUFACTURE OF THE STARTING SUBSTANCES

Example A: Manufacture of 1,3-di-($\beta$-hydroxy-$\beta$-phenyl-ethyl)-5,5-dimethylhydantoin A mixture of 512.6 g. of 5,5-dimethylhydantoin (4.0 mols), 500 ml. of dimethylformamide and 3.4 g. of lithium chloride is stirred at 120° C. 1058.0 g. of styrene oxide (8.8 mols) are added dropwise at 119–122° C., over the course of two hours, to this clear pale yellow solution. The reaction is slightly exothermic, so that the heating bath can periodicaly be removed. After the dropwise addition, the mixture is stirred for a further 3 hours at 120° C. The clear, orange-coloured solution is contrated at 85° C. on a rotary evaporator under a waterpump vacuum and is subsequently dried at 90° C. (0.1 mm. Hg). 1473.0 g. of a clear, orange-brown, highly viscous resin (100% of theory) are obtained.

This crude 1,3 - di - ($\beta$-hydroxy-$\beta$-phenylethyl)-5,5-dimethylhydantoin can be purified by vacuum distillation. 70% of the material employed distil at 260° C. under 0.3 mm. Hg. A colourless to pale yellow, viscous liquid is obtained, which on cooling solidifies to a glassy brittle mass. This substance is pure 1,3-di-($\beta$-hydroxy-$\beta$-phenyl-ethyl)-5,5-dimethylhydantoin.

Elementary analysis shows—Found (percent): C, 68.46; H, 6.56; N, 7.58. Calculated (percent): C, 68.46; H, 6.57; N, 7.60.

Determination of the molecular weight by vapour pressure osmometry in acetone shows a molecular weight of 356 (theory 368.42).

The infra-red spectrum (material ground with Nujol) shows, inter alia, through the presence of intensive absorptions at 3450 cm.$^{-1}$ (—OH), 1758 cm.$^{-1}$ and 1685 cm.$^{1-}$ (C=O) 697 cm.$^{-1}$, that the desired substance is obtained.

The proton-magnetic resonance spectrum (60 mc. H—NMR; recorded in CDCl$_3$ at 35° C. with tetramethylsilane (TMS) as an internal standard) proves the structure shown below, through the presence of the signals, quoted below, for the 24 protons present:

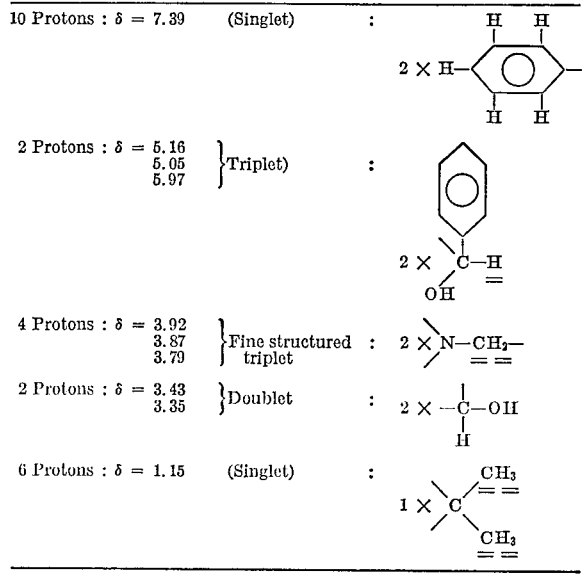

This at the same time shows that the structural element.

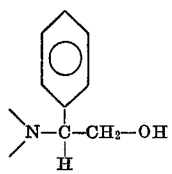

is not present, since in this element the OH signal would have to be a triplet; furthermore, the proton on the tertiary C atom would in this case be expected at about δ=3.80, and furthermore the protons of the —CH₂ group would then have to appear at about δ=3.0.

The new substance thus corresponds to the following structure:

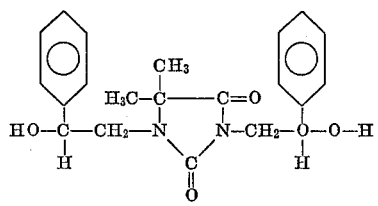

Example B: Manufacture of 1,3-di-(β-hydroxy-β-phenylethyl)-6-methyluracil

A solution of 63 g. of 6-methyluracil (0.5 mol) and 0.5 g. of lithium chloride in 800 ml. of dimethylformamide is stirred at 120° C. 132.2 g. of styrene oxide (1.1 mols) are added dropwise, with stirring, over the course of 2 hours. After the dropwise addition, the mixture is stirred for a further 2 hours at 130° C. The resulting clear, yellow solution is concentrated on a rotary evaporator at 80° C., under a waterpump vacuum, and is subsequently dried at 80° C. (0.1 mm. Hg). 180 g. (98.3%) of crude 1,3-di-(β-hydroxy-β-phenylethyl)-6-methyluracil are obtained in the form of a clear, transparent, light yellow, solid mass. For purification, the product is recrystallised from ethanol/water. 116.5 g. of pure product are obtained; the melting point is about 139.5–141° C.

Elementary analysis shows 6.04% H (calculated, 6.05% H). The infra-red spectrum shows, inter alia, through the absence of the N—H frequencies and through the presence of an intensive absorption at 3340 cm.⁻¹, that the desired substance is obtained.

The proton-magnetic resonance spectrum (60 mc. N—NMR, recorded in CDCl₃ at 35° C., with TMS as the standard) shows, through the following signals, that the new di-alcohol has the structure given below: According to integration, 22 protons are present (theory, 22).

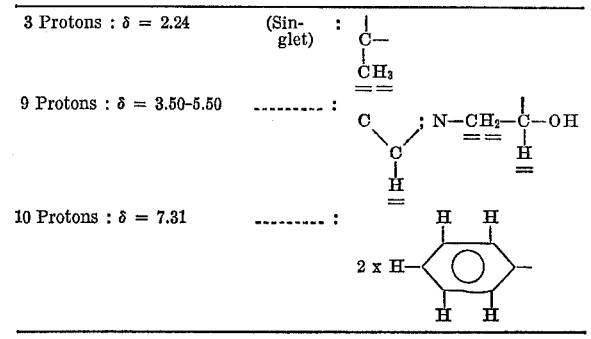

| | | |
|---|---|---|
| 3 Protons : δ = 2.24 | (Singlet) | |
| 9 Protons : δ = 3.50–5.50 | | |
| 10 Protons : δ = 7.31 | | |

Example C: Manufacture of 1,3-di-(β-hydroxy-β-phenylethyl)-5,5-dimethyl-6-isopropyl-5,6-dihydrouracil A mixture of 184.24 g. of 5,5-dimethyl-6-isopropyl-5,6-dihydrouracil (=2,4-dioxo-5,5-dimethyl-6-isopropylhexahydropyrimidine) (1 mol), 1.27 g. of lithium chloride and 1 litre of dimethylformamide is stirred at 150° C. 252.5 g. of styrene oxide (2.1 mols) are slowly added dropwise over the course of 3 hours. After the dropwise addition, the mixture is stirred for a further 3 hours at 150° C. The light brown, slightly cloudy solution is clarified by filtration and concentrated on a rotary evaporator at 80° C. under a waterpump vacuum, and subsequently dried at 80° C./0.1 mm. Hg. 349 g. of an orange-brown, clear and transparent slightly tacky, solid residue (82.5% of theory) are obtained. The infra-red spectrum shows, through the absence of N—H frequencies and through OH absorptions, that 1,3-di-(β-hydroxy-β-phenylethyl)-5,5-dimethyl-6-isopropyl-5,6-dihydrouracil has been produced, as desired.

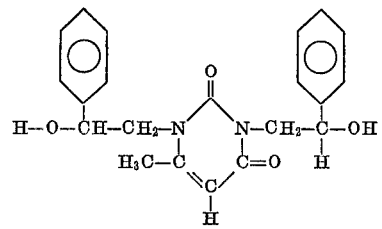

Example D: Manufacture of 1,3-di-(β-hydroxy-β-phenylethoxy - β - phenylethoxy - β - phenylethyl) - 5,5 - dimethylhydantoin A solution of 101 g. of the 1,3-di-(β-hydroxy-β-phenylethyl)-5,5-dimethylhydantoin (0.274 mol), manufactured according to Example A, in 500 ml. of dioxane is mixed with 3.0 ml. of 47% strength boron fluoride diethyl etherate solution in diethyl ether and stirred at 80° C., whereupon a claret solution results. 197.5 g. of styrene oxide (1.642 mol) are slowly added dropwise to this solution over the course of 45 minutes. The reaction is so strongly exothermic that the heating bath is removed, and the contents of the flask reach a maximum temperature of 87° C. After the addition of styrene oxide, the mixture is further stirred until the batch has cooled to room temperature. The pH of the solution, which is now pale yellow, is 4. The pH value is adjusted to 7.0 by means of 30% strength sodium hydroxide solution. The solution is concentrated to 250 ml. on a rotary evaporator and then cooled (10° C.) and filtered to remove inorganic constituents. Thereafter the filtrate is completely concentrated (60° C./waterpump vacuum). Drying takes place at 90° C./0.1 mm. Hg. 245 g. of a slightly yellowish, clear, solid resin are obtained. The increase from 101 g. to 245 g. shows that 4 mols of styrene oxide have reacted per mol of starting diol.

Elementary analysis shows — Found (percent): C, 75.1; H, 6.6; N, 3.3. Calculated (percent) (for 4 mols of styrene oxide per mol of diol): C, 75.1; H, 6.6; N, 3.3.

This ratio can also be determined by means of the proton-magnetic resonance spectrum (60 mc.—HNMR) from the integration ratio of the methyl protons to the aromatic protons; here again it is found that essentially the following is the correct average structure:

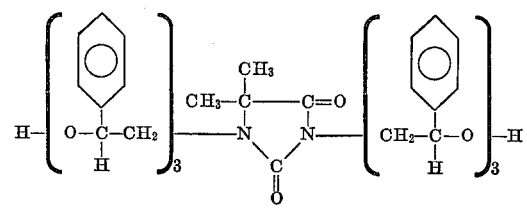

Example E: Manufacture of 3-(β-hydroxy-β-phenyl-ethyl)-5,5-dimethylhydantoin A mixture of 508 g. of 5,5-dimethylhydantoin (3.96 mols), 5.05 g. of lithium chloride and 550 ml. of dimethylformamide is stirred at 125° C. 480.6 g. of styrene oxide (4.0 mols) are added dropwise thereto over the course of 90 minutes. Thereafter the mixture is stirred for a further 180 minutes at 125° C. The reaction mixture is filtered and concentrated at 90° C. on a rotary evaporator under a waterpump vacuum, and the residue is subsequently dried to constant weight at 90° C. under 0.1 mm. Hg. 983 g. (99.9% of theory) of a yellow-white crystal mass are obtained. For purification, the product can be recrystallised from acetone. Colourless, glistening, fine crystals are obtained, which melt at 146–146.5° C.

Elementary analysis shows the following values.— Found (percent): C, 62.86; H, 6.4; N, 11.5. Calculated (percent): C, 62.89; H, 6.5; N, 11.3.

The infra-red spectrum (material ground with Nujol) shows the OH absorption at 3430 cm.$^{-1}$, and the carbonyl frequencies appear at 1760, 1730 and 1690 cm.$^{-1}$.

The proton-magnetic resonance spectrum (60 mc. H—NMR, recorded in CDCl$_3$ at 35° C. against TMS) shows the following signals:

| | | |
|---|---|---|
| 6H : δ = 1.32 | (Singlet) | \C/ CH$_3$ / \ CH$_3$ |
| 3H : δ = 3.75–4.00 | (Multiplet) | —N—CH$_2$— and —OH |
| 1H : δ = 5.0 | ....do...... | 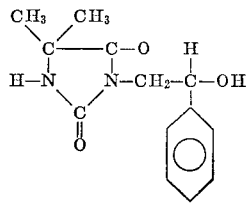 |
| 1H : δ = 6.50 | ....do...... | N$_1$—H |
| 5H : δ = 7.34 | (Singlet) | Aromatic protons. |

In total, 16 protons are thus found (theory=16).

The mass spectrum is also in accord with the structure given below. The molecule-ion is found at 248, which agrees with the theoretical molecular weight of 248.3. Furthermore, the following characteristic fragments are found: 231 (248—OH): 171 (238—C$_6$H$_5$): 142 (248—C$_6$H$_5$CO): 127 (=142—CH$_3$) etc.

The new monoalcohol thus has the following structure

Example F: Manufacture of 1,3-di-(β-hydroxy-β-phenylethyl)-5-isopropylhydantoin A mixture of 60.08 g. of 5-isopropylhydantoin (0.4226 mol), 300 ml. of dimethylformamide and 0.5 g. of lithium chloride is stirred at 120° C. 132.1 g. of styrene oxide (1.0995 mols) are added dropwise thereto over the course of 3 hours. Thereafter the mixture is allowed to continue reacting for a further 180 minutes at 130° C. The filtered reaction mixture is concentrated at 80° C. on a rotary evaporator under a waterpump vacuum and is subsequently dried to constant weight at 85° C./0.1 mm. Hg. 161 g. of a light yellow crystal mass (99.6% of theory) are obtained, and this mass can be purified by recrystallisation from ethanol. Elementary analysis shows 6.87% H (theory 6.85% H) and 7.45% N (theory 7.33% N); the proton-magnetic resonance spectrum is also in agreement with the following structure:

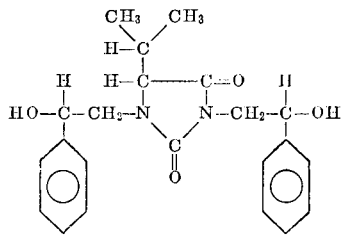

Example G: Manufacture of 1,3-di-(β-hydroxy-β-phenylethyl)-5-ethyl-5-phenylbarbituric acid A mixture of 116.12 g. of 5-ethyl-5-phenyl-bartituric acid (0.5 mol), 0.5 g. of lithium chloride and 500 ml. of dimethylformamide is stirred at 120° C. 132.16 g. of styrene oxide (1.1 mols) are added dropwise to this clear solution over the course of 75 minutes. The mixture is then further left at 130° C. for 205 minutes, cooled to 50° C., filtered and concentrated at 75° C. on a rotary evaporator under a waterpump vacuum, and thereafter dried to constant weight at 85° C. and 0.1 mm. Hg.

235 g. of a clear, light yellow, viscous substance (99.3% of theory) are obtained. The proton-magnetic resonance spectrum (60 mc. H—NMR, recorded in CDCl$_3$ at 35° C., against TMS) shows, inter alia, through the integration ratio of the signals at δ=0.8 (multiplet of the

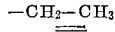

group) and δ=7.3 (multiplet of the aromatic protons) of 3/15, that the substance has the following formula:

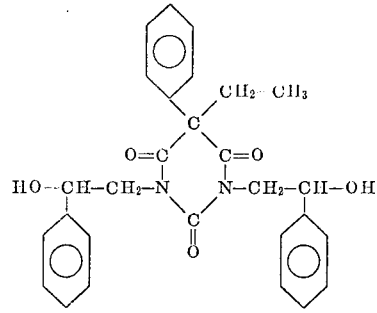

MANUFACTURE OF THE GLYCIDYL ETHERS

Example 1: Manufacture of 1,3-di-(β-glycidyloxy-β-phenylethyl)-5,5-dimethylhydantoin A mixture of 552.0 g. of the crude 1,3-di-(β-hydroxy-β phenylethyl)-5,5-dimethylhydantoin manufactured according to Example A (1.5 mols), 4.97 g. of tetraethyl-ammonium chloride and 2220 g. of epichlorohydrin (24 mols) is stirred for 2 hours at 90° C. 300.0 g. of 50% strength aqueous sodium hydroxide solution (3.75 mols) are then slowly added dropwise over the course of 2 hours at 60° C., with vigorous stirring; at the same time the water present in the reaction mixture is continuously removed from the batch by azeotropic circulatory distillation, and separated off; 204 ml. of water are found (theory: 204 ml.). After the dropwise addition of the sodium hydroxide solution, the last remnants of water are still removed from the circuit over the course of 10 minutes. The sodium chloride produced during the reaction is then removed by filtration. The filter residue is rinsed with 100 ml. of epichlorohydrin. The combined epichlorohydrin solutions are cooled to room temperature and then washed with 200 ml. of water to remove the last remnants of salt. The aqueous phase is separated off and the organic layer is concentrated on a rotary evaporator at 60° C. bath temperature under a waterpump vacuum. Thereafter the material is dried to constant weight at 60° C./0.1 mm. Hg.

A light orange-red viscous epoxide resin is obtained in 100% yield (719.1 g.).

The epoxide content is 4.11 equivalents/kg., corresponding to 98.7% of theory. The total chlorine content is 0.9%. The infre-red spectrum shows, inter alia, through the absence of the absorption at 3450 cm.$^{-1}$ and through the presence of bands which can be assigned to the ether groups and epoxide groups, that the new epoxide resin has the following structure:

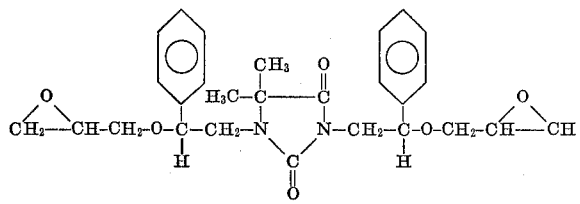

Example 2: Manufacture of 1,3-di-($\beta$-glycidyloxy-$\beta$-phenylethyl)-6-methyluracil A mixture of 91.5 of 1,3-di-($\beta$-hydroxy-$\beta$-phenylethyl)-6-methyluracil (0.25 mol) manufactured according to Example B, 1.24 g. of tetraethylammonium chloride and 462 g. of epichlorohydrin (5 mols) is stirred for 1.5 hours at 90° C. A clear light red solution is thereby produced. Thereafter 52.0 g. of 50% strength sodium hydroxide solution (0.65 mol) are slowly added dropwise at 60° C., with vigorous stirring, over the course of 2 hours, with the water present in the reaction mixture being removed in accordance with Example 1. Working-up takes place in accordance with Example 1.

110 g. of a highly viscous, clear, transparent, light red resin (92% of theory) are obtained. The epoxide content is 3.97 equivalents/kg. (94.8% of theory). The total chlorine content is 1.8%.

The proton-magnetic resonance spectrum (60 mc. H—NMR, recorded in CDCl$_3$ at 35° C., TMS as the standard) shows, inter alia, through the presence of the signals for

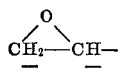

($\delta$=2.53–2.85 and $\delta$=3.01–3.31), that the epoxide resin essentially ha the following structure:

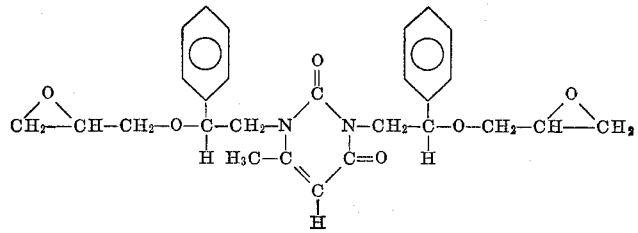

Example 3: Manufacture of 1,3 - di - ($\beta$-glycidyloxy-$\beta$-phenylethoxy - $\beta$ - phenylethoxy-$\beta$-phenylethyl)-5,5-dimethylhydantoin A mixture of 100 g. of the product consisting mainly of 1,3-di-($\beta$-hydroxy-$\beta$-phenylethoxy - $\beta$ - phenylethoxy-$\beta$-phenylethyl)-5,5 - dimethylhydantoin, manufactured according to Example D (0.1178 mol), 0.585 g. of tetraethylammonium chloride and 434 g. of epichlorohydrin (4.69 mols) is stirred for 1½ hours at 90° C. A pale orange-red, clear solution is produced. 24.5 f. of 50% strength aqueous sodium hydroxide solution (0.306 mol) are then slowly added dropwise at 60° C., with vigorous stirring, over the course of 2 hours, with the procedure described in Example 1 being followed. Working-up also takes place as described in Example 1.

107.0 g. of a clear, yellow, viscous epoxide resin (corresponding to 94.7% of theory) are obtained. The epoxide content is 2.03 equivalents/kg., corresponding to 97.6% of theory.

Example 4: Manufacture of 1,3 - di - ($\beta$-glycidyloxy-$\beta$-phenylethyl) - 5,5 - dimethyl - 6 - isopropyl-5,6-dihydrouracil 212.3 g. of the 1,3-di-($\beta$-hydroxy-$\beta$-phenylethyl)-5,5-dimethyl-6-isopropyl-5,6-dihydrouracil (0.5 mol), manufactured according to Example C, together with 925 g. of epichlorohydrin (10 mols) and 2.5 g. of tetraethylammonium chloride are stirred for 90 minutes at 90° C. Thereafter dehydrohalogenation is carried out with 104.0 g. of 50% strength aqueous sodium hydroxide solution (1.3 mols), as described in more detail in Example 1.

Working-up also takes place in accordance with Example 1. 257.5 g. of a brown, viscous resin (96% of theory) are obtained, having an epoxide content of 3.64 equivalents/kg. (97.5% of theory) (HClO$_4$ titration). The epoxide content can be estimated as 3.58 equivalents/kg. from the proton-magnetic resonance spectrum. The total chlorine content is about 1.2%.

Example 5: Manufacture of 1-glycidyl-3-($\beta$-glycidyloxy-$\beta$-phenylethyl)-5,5-dimethylhydantoin A mixture of 40 mols of epichlorohydrin (3,700 g.), 9.97 g. of tetraethylammonium chloride and 496.6 g. of the 3-($\beta$-hydroxy-$\beta$-phenylethyl)-5,5-dimethylhydantoin (2 mols) manufactured according to Example E, is stirred for 30 minutes at 90° C. Dehydrohalogenation is then carried out with 409 g. of 50% strength aqueous sodium hydroxide solution, analogously to Example 1. In doing so, 275 ml. of water are removed from the circuit (99.5% of theory). The further working-up is carried out in accordance with Example 1.

A highly viscous, light yellow, clear resin having an epoxide content of 5.55 equivalents/kg. (99.8% of theory) (HClO$_4$ titration) is obtained in 95% yield (684.0 g). From the proton-magnetic resonance spectrum (comparison of the signals for

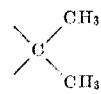

with the signal for

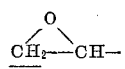

the epoxide content can be given as 98% of theory.

The total chlorine content is 1.5%. Elementary analysis shows 6.67% H (theory 6.71% H) and 7.61% N (theory 7.77% N). The mass spectrum shows a molecule-ion of 360 units, which agrees very well with the theoretical molecular weight of 360.4. Furthermore the mass spectrum shows, through the following characteristic fragment ions, that the new epoxide resin has the structure given below.

317 (M—CHO—CH$_2$) (M=molecule-ion); 303 (M—(CH$_2$—CH—O—CH$_2$)
287 (M—(OCH$_2$—CH
            |
            O—CH$_2$)

286 (287—H); 243 (286—CHOCH$_2$)

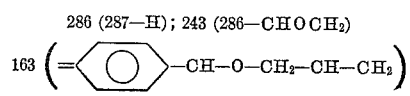

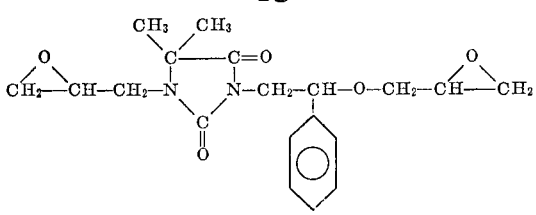

Example 6: Manufacture of 1,3 - di-[β-(β'-methyl)-glycidyloxy-β-phenylethyl]-5-isopropylhydantoin A mixture of 78 g. of the 1,3-di-(β-hydroxy-β-phenylethyl)-5-isopropylhydantoin (0.22 mol) manufactured according to Example F, 0.965 g. of tetramethylammonium chloride and 692.0 g. of β-methylepichlorhydrin is treated as described in Example 1.

The dehydrohalogenation is carried out with 44.0 g. of 50% strength aqueous sodium hydroxide solution, in accordance with Example 1.

The mixture is worked up analogously to Example 1, and 102 g. (corresponding to 93.7% of theory) of a viscous, light brown resin containing 2.83 epoxide equivalents/kg. (70.05% of theory) are obtained. The chlorine content (total chlorine content) is 1.3%.

Example 7: Manufacture of 1,3 - di-(β-glycidyloxy-β-phenylethyl)-5-ethyl-5-phenylbarbituric acid A solution of 118.13 g. of the 1,3-di-(β-hydroxy-β-phenylethyl) - 5-ethyl-5-phenyl-barbituric acid manufactured according to Example G (0.25 mol) and 1.3 g. of tetraethylammonium chloride in 925 g. of epichlorhydrin is treated in accordance with Example 1. Thereafter the material is dehydrohalogenated with 50.0 g. of 50% strength aqueous sodium hydroxide solution in accordance with Example 1. The mixture is worked-up as described in Example 1, and 141.0 g. of a yellowish, clear, very highly viscous resin (98.1% of theory) containing 2.52 epoxide equivalents/kg. (72.4% of theory) are obtained. The total chlorine content is 1.1%.

EXAMPLES OF USE

Example I

A homogeneous solution is prepared at 55° C. from 61.9 parts of the diglycidyl ether manufactured according to Example 1, having an epoxide content of 4.11 equivalents/kg., and 32.9 parts of hexahydrophthalic anhydride. The mixture is poured into aluminium moulds prewarmed to 80° C. (13.5 x 4.1 x 1.2 cm. at approx. 0.15 mm. wall thickness for mechanical values; 13.5 x 13.5 x 0.4 cm. and 13.5 x 13.5 x 0.2 cm. at 0.4 cm. wall thickness for electrical tests), and cured in 2 hours/80° C.+3 hours/120° C.+15 hours/150° C. Using the Tecam gelation timer, the gel time of a 50 g. sample of the above mixture is found to be 74.0 minutes at 80° C.

The yellow, clear, transparent mouldings thus obtained show the following properties:

Flexural strength (VSM 77103)—10.4 kp./mm.$^2$
Deflection (VSM 77103)—3.2 mm.
Heat distortion point according to Martens (DIN 53458)—84° C.
Water absorption (4 days/20° C.)—0.37%
Breakdown voltage (VDE 0303)
Tracking resistance (VDE 0303) level—KA 3c
Arcing resistance (VDE 0303) level—L 4
Dielectric loss factor tan δ (DIN 53483) 25° C.: 0.0035
Dielectric loss factor tan δ (DIN 53483) 80° C.: 0.0065
Dielectric constant ε (DIN 53483) 25° C.: 3.25
Dielectric constant ε (DIN 53483) 80° C.: 3.40
Specific resistance ρ (VDE 0303) 25° C.: 9×10$^{16}$Ω·cm.

Example II

A homogeneous mixture is manufactured at 50° C. from 36.4 parts of the diglycidyl ether manufactured according to Example 1, having an epoxide content of 4.11 equivalents/kg., 25.3 parts of an industrially manufactured diglycidyl ether of 1,3-di-(β-hydroxypropyl)-5,5-dimethylhydantoin, having an epoxide content of 5.73 equivalents/kg., and 38.7 parts of hexahydrophthalic anhydride.

This mixture is introduced into an aluminium mould (13.5 x 4.1 x 1.2 cm., wall thickness approx. 0.15 mm.) pre-warmed to 80° C., and cured in accordance with the following temperature programme: 1 hour/80° C.+3 hours/120° C.+15 hours/150° C. The glass-clear, light yellow moulding thus obtained shows the following mechanical properties:

Flexural strength (VSM 77103)—13.9 kp./mm.$^2$
Deflection (VSM 77103)—7.5 mm.
Water absorption (4 days, 20° C.)—0.42%

Example III

A mixture of 61.9 parts of the diglycidyl ether manufactured according to Example 1, having 4.11 epoxide equivalents/kg., and 32.0 g. of phthalic anhydride is stirred at 120° C. to give a homogeneous mass, and immediately poured into an aluminium mould (13.5 x 4.1 x 1.2 cm., wall thickness approx. 0.15 mm.) prewarmed to 120° C. Curing takes place for 3 hours/120° C.+15 hours/150° C. A light brown, clear, transparent moulding, having the following properties is obtained:

Flexural strength (VSM 77103)—14.91 kg./mm.$^2$
Deflection (VSM 77103)—8.9 mm.
Impact strength (VSM 77105)—14.75 cm. kg./cm.$^2$
Heat distortion point according to Martens (DIN 53458)—75° C.
Water absorption (4 days/20° C.)—0.19%

Example IV

A mixture of 80.5 parts of the diglycidyl ether manufactured according to Example 1, having 4.11 epoxide equivalents/kg., and 56.6 parts of an industrially manufactured diglycidyl ether of 1,3-di-(β-hydroxy-n-propyl)-5,5 - dimethylhydantoin (epoxide content: 5.73 equivalents/kg.) and 19.4 g. of triethylenetetramine is homogeneously stirred at room temperature and then poured into an aluminium mould (13.5 x 13.5 x 0.4 cm., wall thickness 0.4 cm.). Curing takes place in 24 hours at 40° C.+6 hours at 100° C. The yellow, clear, transparent casting thus obtained shows the following mechanical values:

Flexural strength (VSM 77103)—10.55 kg./mm.$^2$
Deflection (VSM 77103)—3.4 mm.
Impact strength (VSM 77105)—16.75 cm. kg./cm.$^2$
Tensile strength (VSM 77101)—4.47 kg./mm.$^2$
Elongation at break (VSM 77101)—1.8%
Heat distortion point according to Martens (DIN 53458)—58° C.

Example V 65.7 parts of the diglycidyl ether manufactured according to Example 2, having an epoxide content of 3.97 equivalents/kg., are stirred at 70° C. with 34.4 parts of hexahydrophthalic anhydride to give a homogeneous melt and poured into an aluminium mould (13.5 x 4.2 x 2.1 cm., wall thickness approx. 0.15 mm.) prewarmed to 80° C. The mixture is cured in 2 hours/80° C.+3 hours/120° C.+15 hours/150° C. The clear, transparent, yellow casting thus obtained has the following properties:

Flexural strength (VSM 77103)—9.71 kg./mm.$^2$
Deflection (VSM 77103)—5.1 mm.
Impact strength (VSM 77105)—10.00 cm. kg./cm.$^2$
Heat distortion point according to Martens
(DIN 53458)—99° C.
Water absorption (4 days/20° C.)—0.40%

Example VI 130 g. of the diglycidyl ether manufactured according to Example 4, having 3.64 epoxide equivalents/kg., are mixed with 81.3 g. of hexahydrophthalic anhydride at 80° C. and introduced into aluminium moulds prewarmed to 80° C. Curing takes place in 2 hours/80° C. and 3 hours/120° C. and 15 hours/150° C. Castings having the following electrical properties are obtained:

Dielectric loss factor tan δ (50 Hz.) at 25° C.—0.004
Dielectric constant εr at 25° C.—3.35
Specific resistance ρ at 22.5—$5 \times 10^{16}$ Ω.cm.

Example VII 68.7 g. of the epoxide resin manufactured according to Example 4, containing 3.64 epoxide equivalent/kg., are mixed with 31.5 g. of phthalic anhydride at 110° C. and poured into an aluminium mould prewarmed to 120° C. Curing is carried out in 5 hours/120° C. and 15 hours/150° C. The resulting moulding shows the following mechanical properties:

Impact strength (VSM 77105)—15–21 cm. kp./cm.$^2$
Heat distortion point according to
  Martens (DIN 53458)—81° C.
Cold water absorption (4 days/20° C.)—0.37%.

Example VIII 89.5 g. of the epoxide resin manufactured according to Example 5, containing 5.55 epoxide equivalents/kg., are mixed with 12.5 g. of triethylenetetramine at room temperature and poured into an aluminium mould of 0.15 mm. wall thickness. Curing takes place in 4 hours/70° C. and 24 hours/40° C. and 6 hours/100° C.

The moulding thus obtained shows the following properties:

Flexural strength (VSM 77103)—14.8 kp./mm.$^2$
Deflection (VSM 77103)—5.1 mm.

We claim:
1. A diglycidyl ether of formula

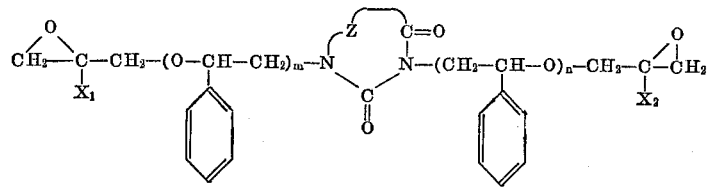

wherein $X_1$ and $X_2$ each represents a member selected from the group consisting of a hydrogen atom and a methyl group and Z represents a member selected from the group consisting of a divalent residue of formulae

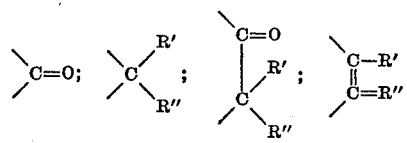

and

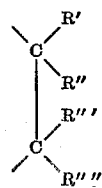

wherein R', R", R''' and R'''' each represents a member selected from the group consisting of alkyl with 1 to 5 carbon atoms, alkenyl with 1 to 5 carbon atoms, cyclohexyl, cyclohexenyl and phenyl, or when the residue Z represents the formula

R' and R" together can also form a member selected from the group consisting of divalent tetramethylene and pentanethylene residue, and m and n each represents an integer having a value of 0 to 4, with the sum of m and n having to be at least 1.

2. A compound as claimed in claim 1 which is 1,3-di-(β-glycidyloxy-β-phenylethyl)-5,5-dimethylhydantion.

3. A compound as claimed in claim 1 which is 1,3-di-(β-glycidyloxy-β-phenylethyl)-6-methyl-uracil.

4. A compound as claimed in claim 1 which is 1,3-di-(β-glycidyloxy - β - phenylethoxy - β - phenyl - ethoxy-β-phenylethyl)-5,5-dimethylhydantoin.

5. A compound as claimed in claim 1 which is 1,3-di-(β-glycidyloxy - β - phenylethyl) - 5,5 - dimethyl - 6 - isopropyl-5,6-dihydrouracil.

6. A compound as claimed in claim 1 which is 1-glycidyl - 3 - (β - glycidyloxy - β - phenylethyl) - 5,5 - dimethylhydantoin.

7. A compound as claimed in claim 1 which is 1,3-di-[β - (β' - methyl) - glycidyloxy - β - phenylethyl] - 5-isopropylhydantoin.

8. A compound as claimed in claim 1 which is 1,3-di-(β - glycidyloxy - β - phenylethyl) - 5 - ethyl - 5 - phenylbarbituric acid.

References Cited
UNITED STATES PATENTS
3,562,275  2/1971  Habermeier et al. ____ 260—260

NICHOLAS S. RIZZO, Primary Examiner
A. M. TIGHE, Assistant Examiner

U.S. Cl. X.R.
260—2, 37, 57, 69, 72, 78, 260, 309.5